May 24, 1932. J. L. BROWNELL 1,859,616
TAXIMETER CONTROL MECHANISM
Filed March 14, 1930
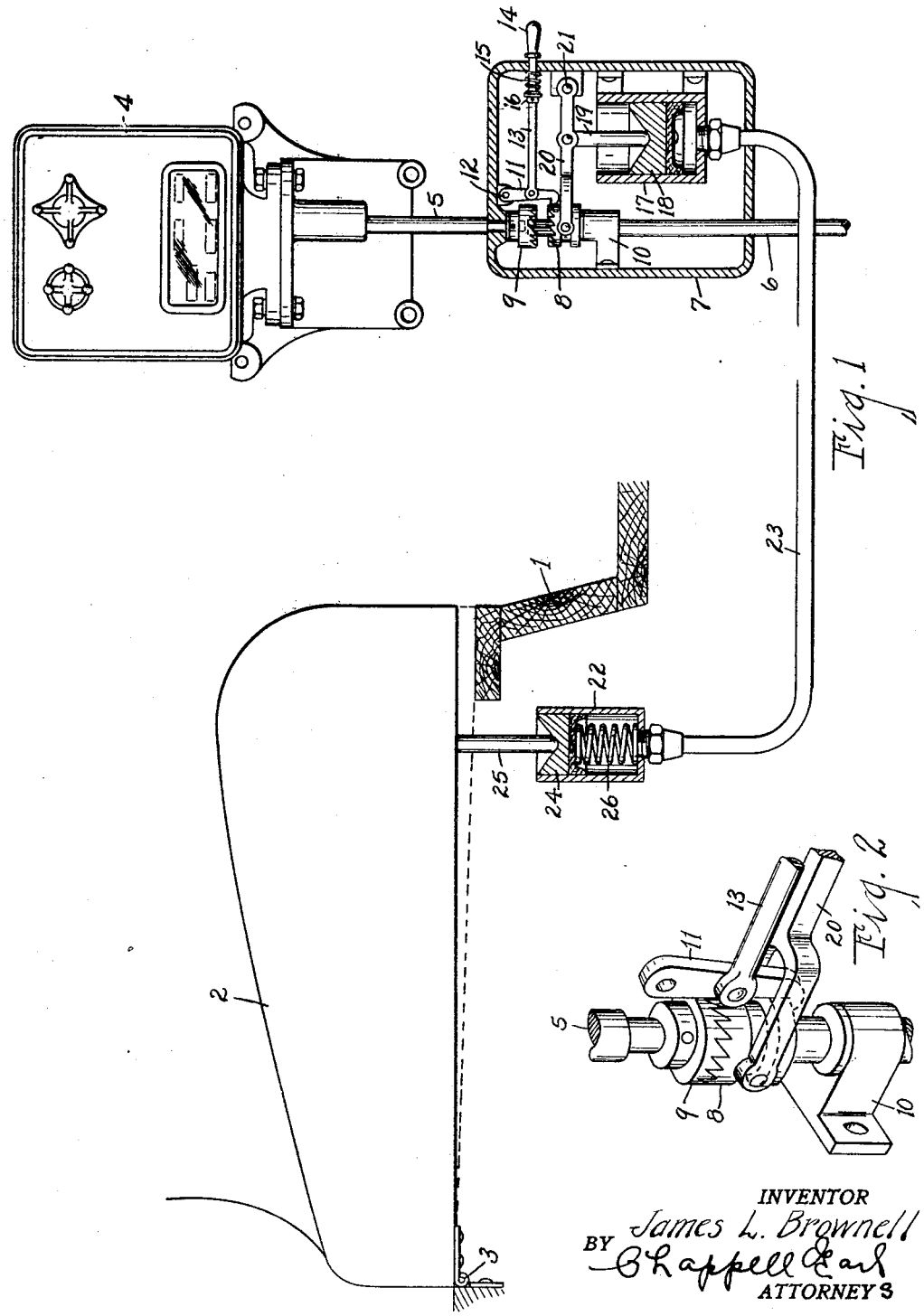
INVENTOR
James L. Brownell
BY Chappell Earl
ATTORNEYS Patented May 24, 1932

1,859,616

UNITED STATES PATENT OFFICE

JAMES L. BROWNELL, OF KALAMAZOO, MICHIGAN, ASSIGNOR TO CHECKER CAB MANUFACTURING CORPORATION, OF KALAMAZOO, MICHIGAN

TAXIMETER CONTROL MECHANISM

Application filed March 14, 1930. Serial No. 435,871.

The main object of this invention is to provide a taxi meter control mechanism or apparatus whereby the meter is automatically put into operation by the passenger occupying a seat in the vehicle, remaining in operation until manually released by the driver or other authorized person.

A further object is to provide an apparatus of this character which can be readily installed in vehicles of the type now in extensive use.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary conventionalized illustration of an apparatus embodying the features of my invention, parts being shown in section and only such parts being shown as are deemed desirable to illustrate my improvements.

Fig. 2 is a fragmentary perspective view of the meter driving clutch and parts of its releasing mechanism.

In the accompanying drawings, 1 represents the body of a motor vehicle such as a taxi, 2 one of the passenger seats thereof, this seat being pivoted at the rear edge as 3.

4 designates the meter and 5 the driven shaft of the meter which projects from its housing. The details of the meter mechanism are not illustrated as they form no part of this invention. The driving shaft 6 of the meter is also shown conventionally.

I provide a housing 7 which is adapted to be placed below the meter, this housing enclosing the driving and driven clutch members 8 and 9 respectively, the driving clutch member being splined to the shaft 6, the driven clutch member being mounted on the driven shaft 5 which projects into the housing.

A supporting bearing 10 is provided for the driving shaft within the housing.

The clutch is retained in its engaged position by means of the catch 11 which is pivoted at 12 on the housing.

The control rod 13 projects through the housing, being provided with a hand piece 14 at its outer end.

A coiled spring 15 arranged between the walls of the housing and the thrust collar 16 on this control rod acts to urge the catch to engaging position.

Within the housing, I mount a cylinder 17 with which the plunger 18 coacts, this plunger acting on the plunger rod 19 pivoted to the clutch engaging lever 20 which is in turn pivoted on the housing at 21.

Below the seat 2 I mount a cylinder 22 which is connected to the cylinder 17 by the conduit 23, the conduit opening to the lower ends of the cylinder.

The cylinder 22 is provided with a plunger 24, its plunger rod 25 engaging the seat so that when the seat is depressed, the plunger 24 is actuated, forcing the actuating fluid into the cylinder 17 thereby engaging the clutch which is held in its engaged position by the catch 11. As soon, however, as the catch 11 is disengaged through the control rod 13, the spring 26 within the cylinder 22 lifts the seat to the position shown by full lines in Fig. 1 and allowing the driven clutch member to return to its disengaged position.

The actuating fluid contained in the cylinder 17, the conduit 23, and the cylinder 22 is preferably a liquid, such as oil or the like.

I have illustrated my improvements mainly in conventional form but it is believed that this disclosure will enable those skilled in the art to embody or adapt the same as may be desired.

Having thus described my invention, what I claim as new and desire to secure by Letters Patent, is:

1. The combination in a motor vehicle provided with a seat supported for vertical movement, of a meter, a meter driving shaft, a driving connection for said shaft to said meter including a clutch, a spring actuated manually releasable catch for holding said clutch in engaged position, a clutch actuating means comprising a cylinder, a plunger in said cylinder operatively connected to said clutch, an actuating cylinder disposed below said seat, a plunger therein operatively associated with said seat to be actuated when the seat is moved downwardly, a return spring for said actuating plunger, and a conduit connecting said actuating cylinder to said clutch cylinder.

2. The combination in a motor vehicle provided with a seat, of a meter, a meter driving shaft, a driving connection for said shaft to said meter including a clutch, a spring actuated manually releasable catch for holding said clutch in engaged position, a clutch actuating means comprising a cylinder, a plunger in said cylinder operatively connected to said clutch, an actuating cylinder disposed below said seat, a plunger therein operatively associated with said seat to be actuated when the seat is occupied, and a conduit connecting said actuating cylinder to said clutch cylinder.

3. The combination in a motor vehicle provided with a seat, of a meter, a driving means for said meter including a clutch, an automatically engaging manually releasable means for holding said clutch in engaged position, a clutch actuating plunger and coacting cylinder, an actuating cylinder disposed below said seat, a plunger therein operatively associated with said seat to be actuated when the seat is occupied, a return spring for said actuating plunger, and a conduit connecting said actuating cylinder to said clutch cylinder.

4. The combination in a motor vehicle provided with a seat, of a meter, a driving means for said meter including a clutch, an automatically engaging manually releasable means for holding said clutch in engaged position, a clutch actuating plunger and coacting cylinder, an actuating cylinder disposed below said seat, a plunger therein operatively associated with said seat to be actuated when the seat is occupied, and a conduit connecting said actuating cylinder to said clutch cylinder.

5. The combination in a motor vehicle provided with a seat, of a meter, a meter driving clutch, retaining means for holding the clutch engaged, a plunger and coacting cylinder operatively associated with said clutch, and an actuating cylinder and coacting plunger operatively associated with said seat to be actuated when the seat is occupied, said cylinders having a fluid connection.

6. The combination in a motor vehicle provided with a seat, of a meter, a meter driving clutch, an automatically engaging manually releasable means for holding said clutch in engaged position, actuating and actuated hydraulic units operatively associated with said seat and clutch respectively, and a conduit connecting said units.

7. The combination in a motor vehicle provided with a seat, of a meter, a meter driving clutch, an automatically engaging manually releasable means for holding said clutch in engaged position, and hydraulic means for engaging said clutch operatively associated with said seat to be actuated when seat is occupied.

In witness whereof I have hereunto set my hand.

JAMES L. BROWNELL.